Dec. 7, 1954
C. FANSHIER
2,696,218
TRUE LEVEL FLOW PICKUP
Filed Sept. 21, 1949
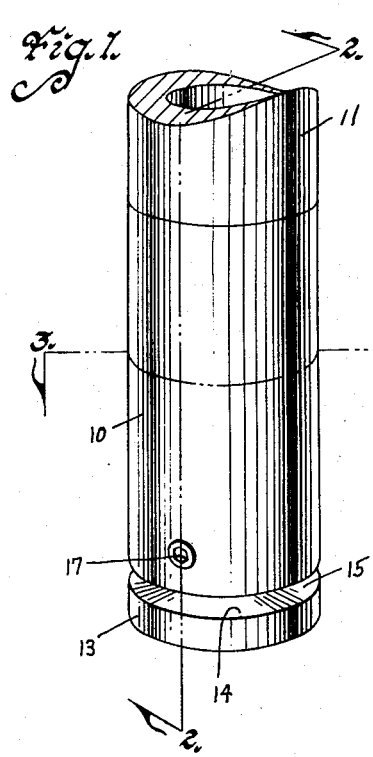
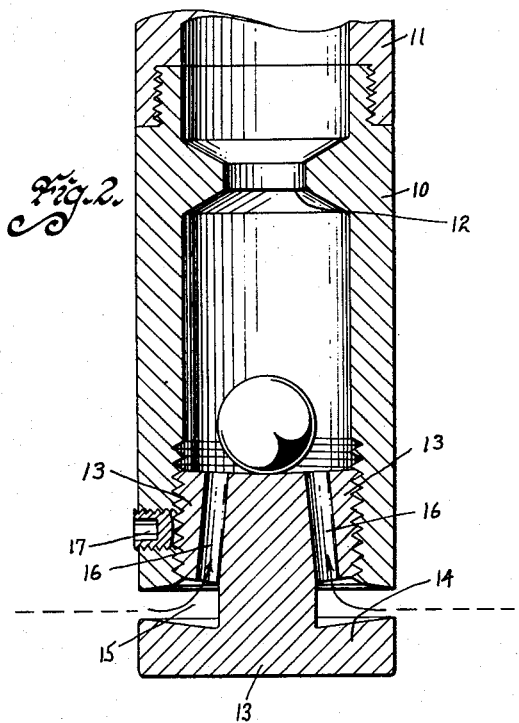
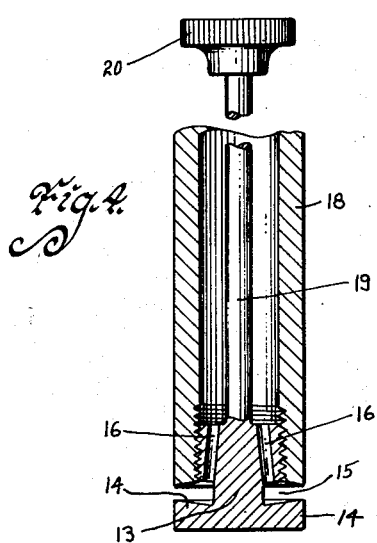
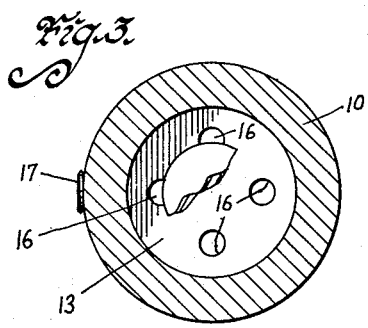
Inventor
Chester Fanshier
by M. Talbert Dick
Attorney
Witness
Edward P. Seeley United States Patent Office 2,696,218
Patented Dec. 7, 1954

2,696,218

TRUE LEVEL FLOW PICKUP

Chester Fanshier, Bartlesville, Okla.

Application September 21, 1949, Serial No. 117,049

3 Claims. (Cl. 137—213)

My invention relates to a flow pickup device for determining the level of a given body of liquid within a container.

Flow pickup devices now in use generally consist of a straight flow tube or check valve in vertical position with the opening at the bottom thereof or a flow tube with an U-shaped end having the inlet pointed upwardly. These are not wholly satisfactory for the reason that in the straight flow tube, the opening or inlet will pick up liquid at a point somewhat above the level of the liquid while the U-shaped flow tube will pick up vapors at a point somewhat below the liquid level.

It is therefore an object of my invention to provide a device for use in determining the true level of a liquid in a container that is not affected by pressure of gases existing in the container and above the liquid level.

A further object of my invention is to provide a flow pickup device that can be adjusted to increase or diminish the volume of flow there-through to meet certain required conditions.

A still further object of this invention is to provide a true level flow pickup device that can be mounted on the bottom of a flow tube such as a liquid level slip tube, fixed tube gauge or the like.

A still further object of my invention is to provide a true level liquid pickup device that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device shown mounted in the bottom of a check valve housing, Fig. 2 is an enlarged longitudinal sectional view of this device taken on the line 2—2 of Fig. 1, Fig. 3 is a cross-sectional view of this device taken on the line 3—3 of Fig. 1, and Fig. 4 is a longitudinal sectional view of this device shown mounted in the bottom of the flow tube minus the check valve with a manual adjustable control arranged therein.

Referring to the drawings I have used the numeral 10 to designate a vertical check valve housing designed to communicate with a conduit 11. A check valve seat 12 and ball is positioned within the housing 10, as shown in Fig. 2. The numeral 13 designates a plug member having the circumscribing flange portion 14 at its bottom. This plug 13 communicates with the lower portion of the housing 10 and may be secured therein in any suitable manner such as by threading, by a drive fit, a slip fit, by drive pins, by welding or it may be made an integral part of the housing. In Fig. 2 I show it threaded in the housing and with the flange 14 of a diameter substantially that of the diameter of the housing 10.

The plug 13 is arranged in the housing 10 so that the flange portion 14 is adjustably spaced apart from the bottom of the housing to form the circumscribing slot 15. The numeral 16 designates a plurality of vertical holes drilled in the upper part of the plug 13 with each hole respectively communicating at its lower end with the slot 15 and at its upper end with the inside of the check valve, as shown in Fig. 2.

The plug 13 is locked at any desired relative position within the housing 10 by any suitable means such as a pin, set screw or the like, and in Fig. 2 I show a set screw 17 for this purpose. It will be appreciated that this device as described and when used is placed within a container (not shown) with the conduit 11 communicating with the outside of the container and that the container will be provided with separate outlet means for draining liquid therefrom.

Under certain conditions it is desirable to adjust the volume of flow of the fluid, or the velocity of flow of the fluid passing through the device. This is accomplished by unscrewing or screwing the plug the proper distance into the valve housing to vary the width of the peripheral slot opening 15. To prevent undue turbulence of the fluid as it changes direction flow the upper surface of the flange 14 may be depressed as shown in Fig. 2.

When it is desired to determine the level of a given body of liquid in a container by the indication of vapor or gas flow through the device, the device operates as follows: As the level of liquid drops, so that its surface falls below the bottom edge of the housing 10, the vapor or gas that exists above the liquid level will be drawn through the device, thereby indicating the exact level of the liquid. Another operation would be where the housing 10 and conduit 11 are lowered or raised in a given amount of liquid. However, regardless of the application of the device the commencement of flow of gas or air through the device will be as of that of the exact level of the liquid at that moment. The reason for this is that in the matter of either liquid or gas the flow must first be horizontal between the flange 14 and end of the housing 10, and then vertically upwardly. This means that the surface of the liquid will not be either raised or lowered by action of the vapor or air commencing to pass through the device and therefore overcomes the objections of both straight flow tubes or U-shaped tubes previously indicated. As is well known in the art of level flow pick up gauges, and of which this invention is a part, the ball check valve is a safety means for preventing excessive flow of either liquid or gas from the container. In the case of conduit 11 breaking at a point outside the container, any great flow of either the liquid or gas through the same would raise the ball check valve and thereby close the entire escaping fluid. Normally, however, the flow through the device will be so restricted that the ball check valve will remain in a lowered inoperative position as shown in Fig. 2, thereby permitting the device to operate as a true level gauge. Obviously, therefore, in some situations a check valve will not be used, such as in Fig. 4. In this construction the plug 13 is screwed directly into the conduit 18. In this structure a distant manual means may be used to adjustably rotate the plug 13. To this end numeral 19 designates a control shaft positioned within the conduit tube 18 and secured at its bottom end to the top of the plug 13. The other end of the shaft 19 is provided with the grip knob 20.

The distance of horizontal flow of any fluid is determined by the thickness of the valve or conduit wall plus the distance between the vertical passageways 16 and the outside of the upper portion of the plug. This distance must be sufficient to prevent any distortion of the liquid level by the intake of the gas or fumes.

Some changes may be made in the construction and arrangement of my true level flow pickup without departing from the real spirit and purpose of my invention, and it is my intention to cover by my claims, any modified forms of structure or use of mechanical equivalents which may be reasonably included within their scope.

I claim:

1. In a true level flow pickup designed to extend into a container holding liquid and gas, a vertical tube member, a one-way check valve in said tube member, a plug member having a circumscribing flange portion on the bottom thereof secured in the bottom of said tube so that the bottom of said tube and top of said flange portion are in horizontal spaced relation; said circumscribing flange portion extending radially downwardly and inwardly so that the spaced relationship between the bottom of said tube member and the top of said circumscribing flange portion is greater at the axis thereof than at its perimeter, a plurality of vertical openings in the upper portion of said plug member with each opening respectively having one end in communication with the inside of said tube and the other end in communication with said space between said tube and said flange portion.

2. In a true level flow pickup designed to extend into a container holding liquid and gas, a vertical tube having a circumscribing groove near the bottom thereof and a passageway from said groove to the inside of said tube so that liquid or gas flowing into said groove must change direction to flow into said tube; the bottom side of said groove extending radially inwardly and downwardly whereby its width is greater at its axis than at its perimeter and thereby prevents undue turbulence of fluid as it changes directions in said groove, and a one-way check valve in said vertical tube.

3. In a true level flow pickup designed to extend into a container holding liquid and gas, a vertical tube having a circumscribing groove near the bottom thereof and a plurality of passageways from said groove to the inside of said tube so that liquid or gas flowing into said groove must change direction to flow into said tube; the bottom side of said groove extending radially inwardly and downwardly whereby its width is greater at its axis than at its perimeter and thereby prevents undue turbulence of fluid as it changes directions in said groove, and a one-way check valve in said vertical tube.

References Cited in the file of this patent

UNITED STATES PATENTS

| Number | Name | Date |
|---|---|---|
| 102,433 | Reinshagen | Apr. 26, 1870 |
| 820,371 | Skinner | May 8, 1906 |
| 2,134,205 | Ribble | Oct. 25, 1938 |
| 2,165,605 | Baker | July 11, 1939 |
| 2,474,469 | Grange | June 28, 1949 |